(12) United States Patent
Hirose

(10) Patent No.: US 11,372,357 B2
(45) Date of Patent: Jun. 28, 2022

(54) IMAGE FORMING APPARATUS FOR CONTROLLING DENSITY OF AN OUTPUT IMAGE BASED ON READ DATA OF TEST IMAGE, AND INFORMATION PROCESSING APPARATUS

(71) Applicant: CANON KABUSHIKI KAISHA, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/827,819

(22) Filed: Mar. 24, 2020

(65) Prior Publication Data
US 2020/0319585 A1  Oct. 8, 2020

(30) Foreign Application Priority Data

Apr. 2, 2019 (JP) .............................. JP2019-070706
Mar. 10, 2020 (JP) .............................. JP2020-041222

(51) Int. Cl.
*G03G 15/00* (2006.01)
*H04N 1/00* (2006.01)

(52) U.S. Cl.
CPC ..... *G03G 15/5062* (2013.01); *G03G 15/6508* (2013.01); *H04N 1/00034* (2013.01); *H04N 1/00045* (2013.01); *H04N 1/00087* (2013.01); *H04N 1/00795* (2013.01); *G03G 2215/00067* (2013.01); *G03G 2215/00177* (2013.01); *G03G 2215/00409* (2013.01); *G03G 2215/00569* (2013.01); *G03G 2215/00679* (2013.01); *G03G 2215/047* (2013.01)

(58) Field of Classification Search
CPC ........... G03G 15/5062; G03G 15/6508; G03G 2215/00067; G03G 2215/00177; G03G 2215/00409; G03G 2215/00569; G03G 2215/00679; G03G 2215/047; H04N 1/00034; H04N 1/00045; H04N 1/00087; H04N 1/00795
See application file for complete search history.

(56) References Cited

U.S. PATENT DOCUMENTS

2011/0261404 A1    10/2011   Umezawa
2017/0171417 A1*   6/2017    Kasuga .............. G03G 15/5062

FOREIGN PATENT DOCUMENTS

JP         2011-234354 A    11/2011

* cited by examiner

*Primary Examiner* — Joseph S Wong
(74) *Attorney, Agent, or Firm* — Venable LLP

(57) ABSTRACT

An image forming unit forms an image based on image data. A roller conveys a sheet from a tray. A reading unit reads the sheet. A controller controls the image forming unit to form a test image on one side of the sheet, controls the roller to convey the sheet on which the test image has been formed, obtains first read data relating to a read result of a first surface of the sheet on which the test image is formed, obtains second read data relating to a read result of a second surface from the first read data and the second read data, selects read data relating to a read result relating to the test image, and controls, based on the selected read data, a density of an output image to be formed by the image forming unit.

19 Claims, 9 Drawing Sheets

FIG. 4
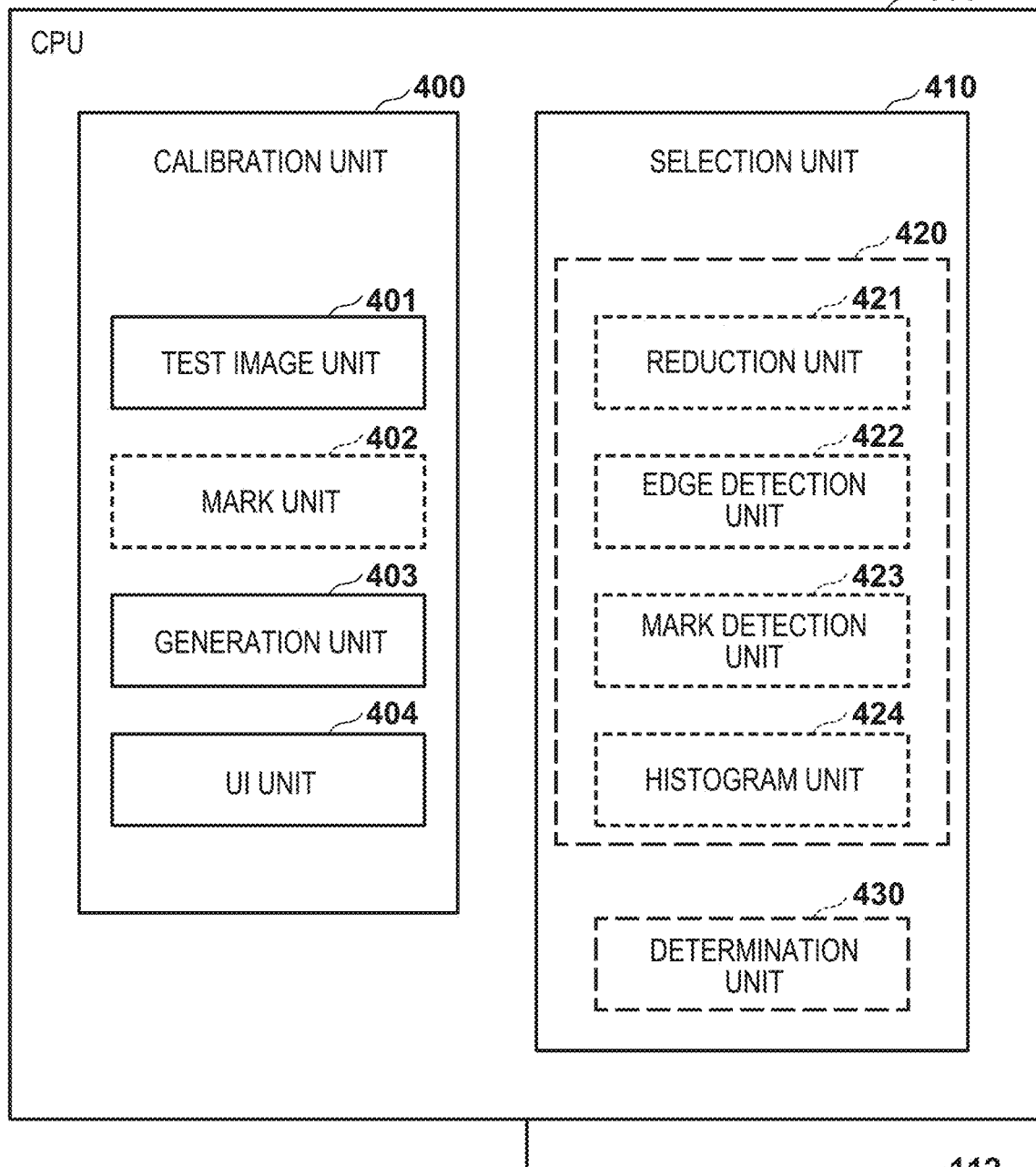
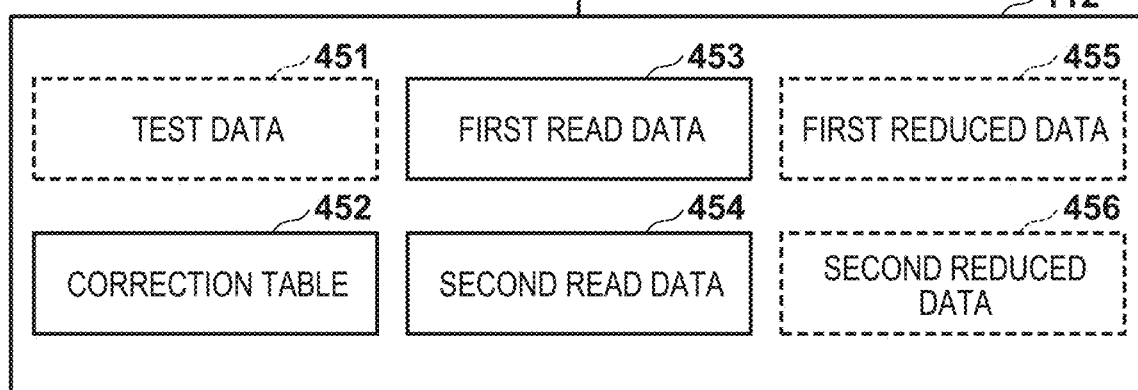

IMAGE FORMING APPARATUS FOR CONTROLLING DENSITY OF AN OUTPUT IMAGE BASED ON READ DATA OF TEST IMAGE, AND INFORMATION PROCESSING APPARATUS

This application claims the benefit of Japanese Patent Application No. 2019-070706, filed Apr. 2, 2019, and Japanese Patent Application No. 2020-041222, filed Mar. 10, 2020, each of which is hereby incorporated by reference herein in its entirety.

BACKGROUND OF THE INVENTION

Field of the Invention

The present invention relates to image density control for controlling the density of an output image based on read data relating to a test image printed on a sheet.

Description of the Related Art

In an image forming apparatus that forms an image on a sheet using ink or toner, the density of the image may vary depending on changes in a usage environment or change over time. Therefore, the image forming apparatus forms a test image on a sheet, causes a reading device to read the test image, and corrects a tone correction condition based on read data relating to the test image. This is called tone correction control in calibration for adjusting image quality. Japanese Patent Laid-Open No. 2011-234354 proposes tone correction control for adjusting atone correction condition so as to suppress an image formed on the front surface of a sheet from appearing on the back surface of the sheet (so-called show-through). More specifically, the image forming apparatus forms a test image only on the front surface (printing surface) of a sheet, and does not form a test image on the back surface. The user places the sheet on a platen of the image reader used to read a document, and causes the image reader to read the test image that was formed on the front surface of the sheet. In addition, the user flips the sheet over, places it on the platen, and causes the image reader to read the back surface of the sheet on which the test image was not formed. Then, the density of a test image for which the show-through does not occur is decided, and a tone correction condition is generated such that the decided density becomes the maximum density.

Although Japanese Patent Laid-Open No. 2011-234354 can prevent show-through, a tone correction condition may be generated in which the tone characteristic of an image formed on the front surface of a sheet by the image forming apparatus does not coincide with the tone characteristic of an input image. Some users may prioritize the tone characteristic of an image formed on the front surface rather than the prevention of show-through. The calibration of Japanese Patent Laid-Open No. 2011-234354 is not suitable for such a user. Further, in order to invert the front and back of the sheet on the platen, a user must open and close a pressing plate in order to place the sheet on the platen. This may be cumbersome for the user. In contrast, using an automatic document feeder (hereafter referred to as an "ADF") that automatically conveys a document placed on a tray to a reading position and causing a reading device to read a test image on a sheet is known. In a case of causing a reading device to read a sheet using an ADF, opening and closing of the pressing plate becomes unnecessary, and a burden for a user is reduced. However, when only one side of a sheet conveyed by an ADF can be read, the readable surface of the sheet is determined when the user places the sheet on the tray of the ADF. Therefore, if the user makes a mistake with the front and back when placing the sheet on the tray, the reading device cannot read the test image that has been formed on the sheet.

SUMMARY OF THE INVENTION

One of the embodiments of the present invention provides an image forming apparatus comprising the following elements. An image forming unit is configured to form an image based on image data. A tray on which a sheet is placed. A roller configured to convey the sheet on the tray. A reading unit is configured to read the sheet conveyed from the tray by the roller. A controller is configured to control the image forming unit to form a test image on one side of the sheet, to control the roller to convey the sheet on which the test image has been formed; obtain first read data relating to a read result of a first surface of the sheet on which the test image is formed, to obtain second read data relating to a read result of a second surface different to the first surface of the sheet on which the test image is formed, from the first read data and the second read data, select read data relating to a read result relating to the test image, and control, based on the selected read data, a density of an output image to be formed by the image forming unit.

Further features of the present invention will become apparent from the following description of exemplary embodiments (with reference to the attached drawings).

BRIEF DESCRIPTION OF THE DRAWINGS

FIG. 4 is a block diagram for describing functions of a CPU.

DESCRIPTION OF THE EMBODIMENTS

Figure 1:
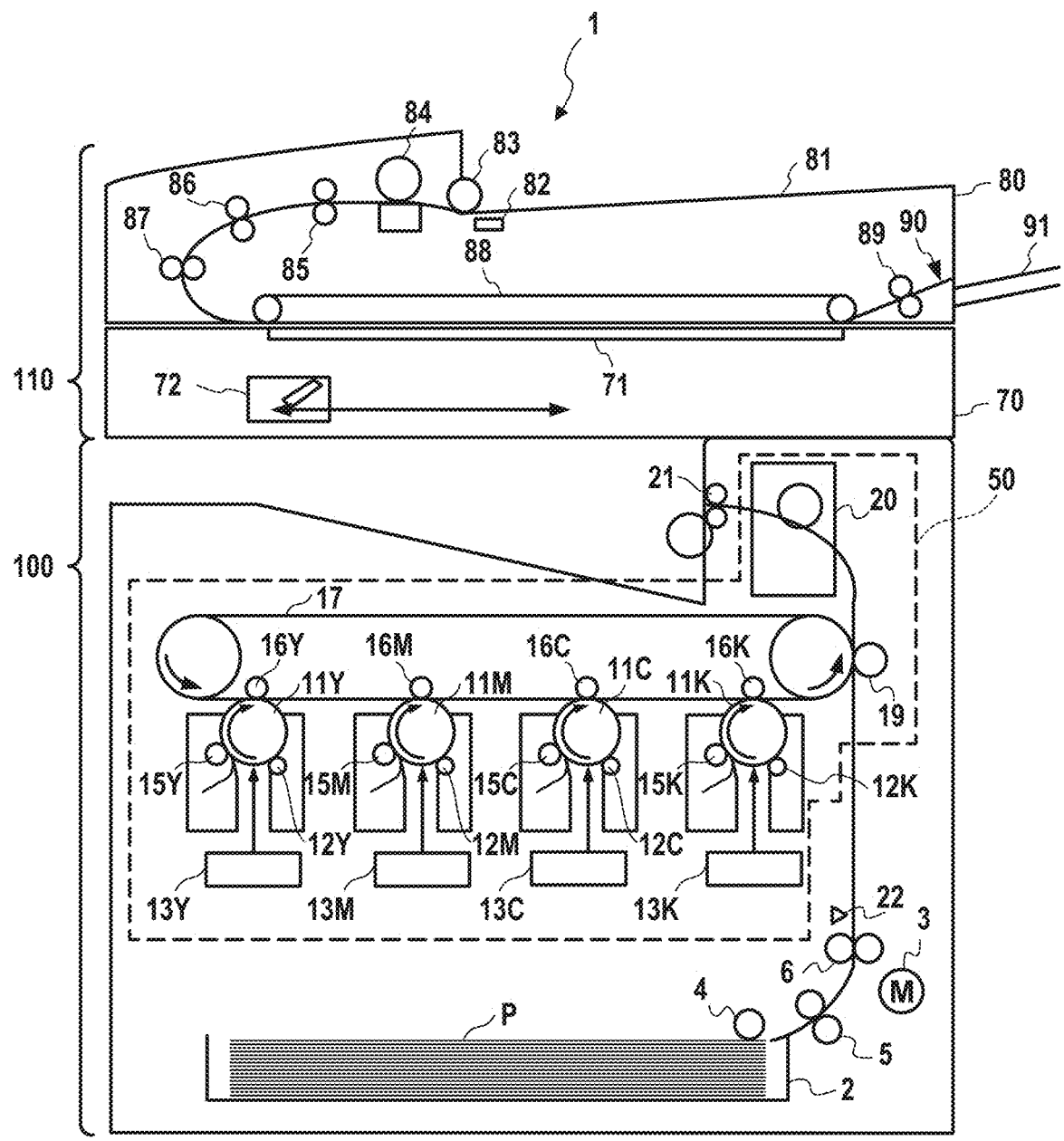
FIG. 1 is a cross-sectional view for describing an image forming apparatus.

Hereafter, embodiments will be described in detail with reference to the attached drawings. Note, the following embodiments are not intended to limit the scope of the claimed invention. Multiple features are described in the embodiments, but limitation is not made on an invention that requires all such features, and multiple such features may be combined as appropriate. Furthermore, in the attached drawings, the same reference numerals are given to the same or similar configurations, and redundant description thereof is omitted.

First Embodiment

[Image Forming Apparatus]

As shown in FIG. 1, an image forming apparatus 1 is a multifunction peripheral (MFP) that includes an electrophotographic printer 100 and an image reader 110. Electrophotographic is merely an example, and a different image forming method such as an inkjet method may be adopted.

Printer 100

An image forming unit 50 forms a color image by superimposing developing agents (toners) of four colors of yellow (Y), magenta (M), cyan (C), and black (K). In FIG. 1, Y, M, C, and K characters indicating toner colors are added to the end of reference numerals, but Y, M, C, and K characters are omitted when matters common to the four colors are described.

A feeding cassette 2 is a storage for storing sheets P. A feeding roller 4 feeds a sheet P from the feeding cassette 2 to a conveyance path. The conveyance roller pair 5 conveys the sheet P fed from the feeding cassette 2 further downstream in a conveyance direction of the sheet P. A registration roller pair 6 is conveyance rollers for aligning a timing at which the sheet P arrives at a secondary transfer roller 19 with a timing at which a toner image arrives at the secondary transfer roller 19. A sheet sensor 22 is provided in the vicinity of the registration roller pair 6, and detects the arrival timing of the sheet P.

In the image forming unit 50, a photosensitive drum 11 is an image carrier for carrying an electrostatic latent image or a toner image. A charging roller 12 charges the surface of the photosensitive drum 11 so that the surface of the photosensitive drum 11 has a uniform potential. An exposure apparatus 13 forms an electrostatic latent image by irradiating the surface of the photosensitive drum 11 with light. A developing device 15 develops the electrostatic latent image using toner to form a toner image. A primary transfer unit 16 transfers the toner image to an intermediate transfer member 17. The secondary transfer roller 19 transfers the toner image from the intermediate transfer member 17 to the sheet P. A fixing device 20 fixes the toner image on the sheet P using heat and pressure. A discharge roller 21 discharges the sheet P to a tray provided outside the image forming apparatus 1.

Image Reader

The image reader 110 includes a reading unit 70 and a document feeder 80. The reading unit 70 includes a platen 71 on which a document (sheet) is placed, and an image sensor 72 that reads a document (sheet) placed on the platen 71. In order to read a document (sheet) placed on the platen 71, the image sensor 72 reads the document (sheet) while moving directly under the platen from right to left in the figure. The image sensor 72 of the present embodiment includes an LED as a light source and an optical component that includes a lens, and reads the surface of a document (sheet) placed on the platen 71 by receiving light reflected from the document (sheet). Note that the reading unit 70 may be configured to have a housing that includes an LED and an optical component, and an image sensor 72, where the housing that includes the LED and the optical component moves without moving the image sensor 72. Note that the document feeder 80 can rotate with respect to the reading unit 70 so that a user can place a document (sheet) on the platen.

A configuration for reading a document (sheet) without a user placing the document (sheet) on the platen 71 will be described below. When a sheet sensor 82 detects that a document (sheet) is placed on a document tray 81, a pickup roller 83 rotates, and the sheet is taken into a conveyance path of the document feeder 80. When a plurality of sheets are pulled in from the document tray 81, a separation roller 84 separates one sheet from the plurality of sheets and conveys the sheet to conveyance rollers 85 and 86 positioned further downstream. The conveyance rollers 85 and 86 correct the skew of the sheet by bringing a leading edge of the sheet into contact with registration rollers 87. When the registration rollers 87 start to rotate, the sheet is conveyed to the reading unit 70. The conveyance belt 88 conveys the sheet along the platen 71. At this time, the image sensor 72 is stationary at the document reading position, and reads an image formed on the sheet which is conveyed along the platen 71. The conveyance belt 88 and discharge rollers 89 discharge the sheet to a discharge tray 91. A discharge sensor 90 detects that the sheet is discharged to the discharge tray 91.

Control Unit

Figure 2:
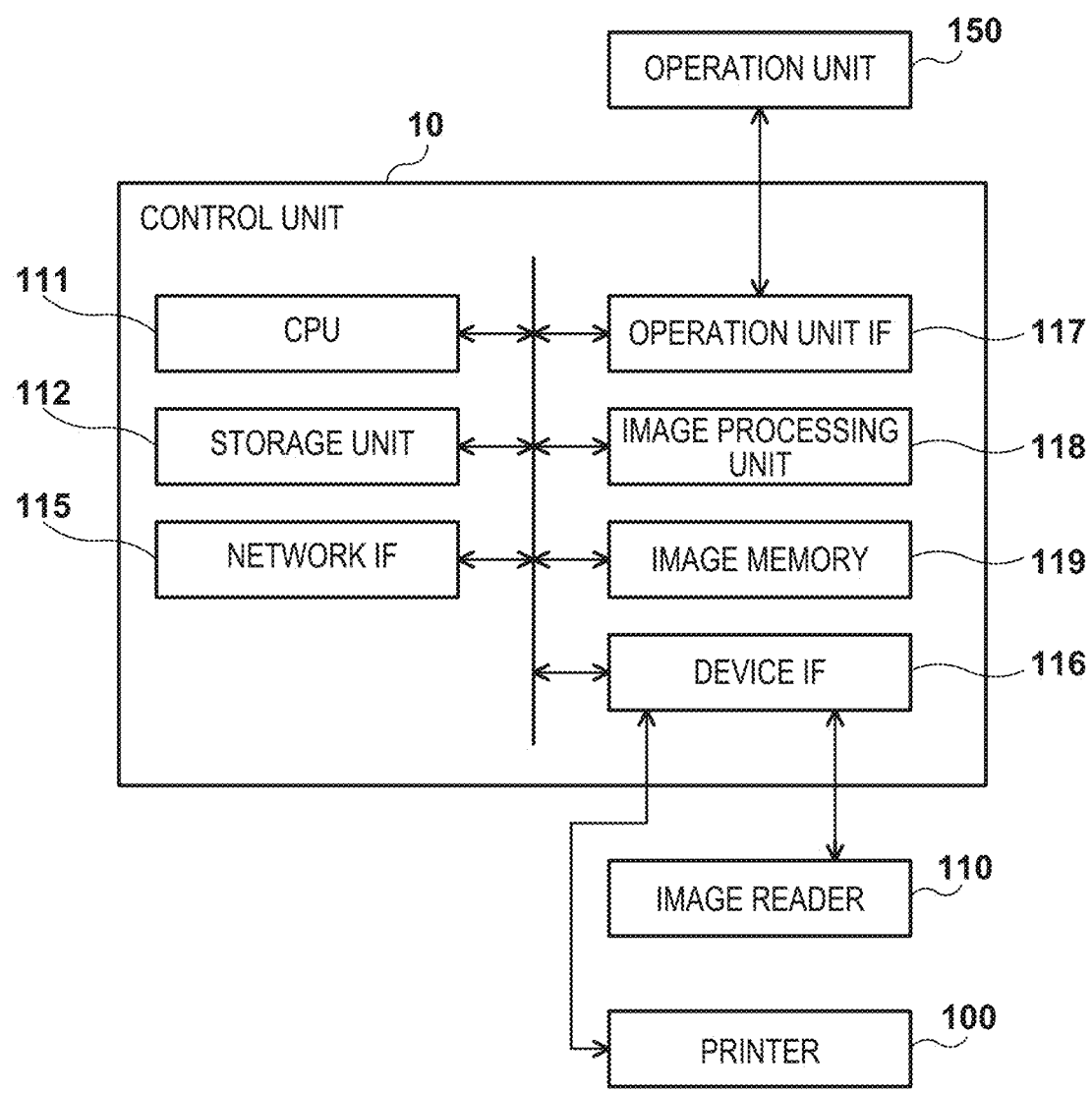
FIG. 2 is a block diagram for describing a control unit.

As shown in FIG. 2, a control unit 10 comprehensively controls the entirety of the image forming apparatus 1. The control unit 10 is connected to the printer 100 via a device IF 116, and controls the printer 100 to form an image on a sheet. The control unit 10 is connected to the image reader 110 via the device IF 116, and obtains image data (read data) of a document generated by the image reader 110. A CPU (Central Processing Unit) 111 is formed by one or more of processors. A CPU 111 controls the image forming apparatus 1 based on a control program stored in a storage unit 112. The storage unit 112 includes a RAM, a ROM, a hard disk drive, and the like. CPU 111 receives print jobs from a host computer, or the like, via a network IF 115. The CPU 111 displays a message on a display apparatus of the operation unit 150 which is connected via an operation unit IF 117, and accepts a user instruction from an input device of the operation unit 150. An image processing unit 118 performs predetermined image processing on print data (image data for printing) received by the network IF 115. The image processing unit 118 develops the print data into bitmap data, converts the color space of the bitmap data (RGB→YMCK), and performs a tone correction based on a tone correction condition. The image processing unit 118 converts the color space of the image data received from the image reader 110 (RGB→YMCK), and performs a tone correction based on a tone correction condition. An image memory 119 is a high-speed memory for temporarily holding image data for image processing. The tone correction condition is, for example, a one-dimensional table used for converting image signal values included in image data. The tone correction condition is used to correct atone characteristic of an image to be formed by the printer 100 to an ideal tone characteristic. The image data converted by the image processing unit 118 is transferred to the exposure apparatus 13 of the printer 100. The exposure apparatus 13 controls light for exposing the photosensitive drum 11 based on the transferred image data.

[Surface Determination]

The image reader 110 has a fixed-document reading mode and a flow-reading mode. In the fixed-document reading mode, the document feeder 80 is opened, a sheet is placed on the platen 71, and the document feeder 80 is closed. The lower surface of the document feeder 80 is a pressing plate that presses the sheet against the platen 71. In this case, the user places the sheet on the platen 71 with the surface on which the test image is formed facing the platen 71. In contrast, in the flow-reading mode, the image of the sheet is read while the sheet placed on the document tray 81 of the document feeder 80 is conveyed by the document feeder 80. In this case, a user often worries whether the sheet should be placed on the document tray 81 with the test image facing up or the sheet should be placed on the document tray 81 with the test image facing down. If there is a mistake with the top and bottom surfaces of the sheet, the CPU 111 cannot create a correct tone correction condition. Therefore, in the present embodiment, the user can place the sheet on the document tray 81 with no awareness of top and bottom with respect to the test image. In this embodiment, the image reader 110 reads both a first surface and a second surface of the sheet. Here, the first surface is a surface that is first read by the image reader 110. The second surface is a surface that is read by the image reader 110 after the first surface. The user may first place a sheet on the document tray 81 so that the test image is visible, and then place the sheet on the document tray 81 so that the test image is not visible. The user may first place a sheet on the document tray 81 so that the test image is not visible, and then place the sheet on the document tray 81 so that the test image is visible. CPU 111 analyzes read data of the first surface and read data of the second surface, and selects the read data that includes a read result for a test image. Further, the CPU 111 creates a tone correction condition based on the selected read data. As a result, the burden on the user regarding placing the sheet on which the test image is formed is reduced.

[Test Image]

Figure 3A:
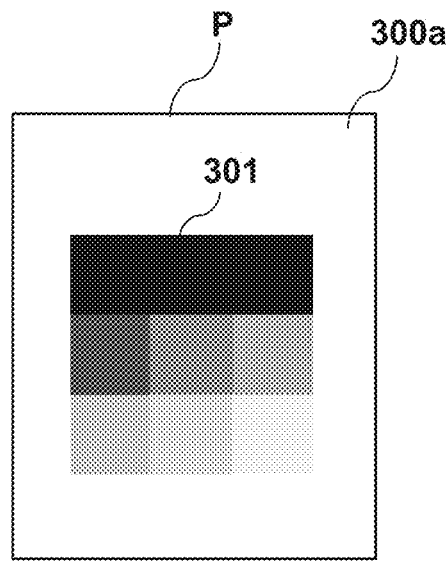
FIGS. 3A to 3D are diagrams for describing test charts.
Figure 3B:
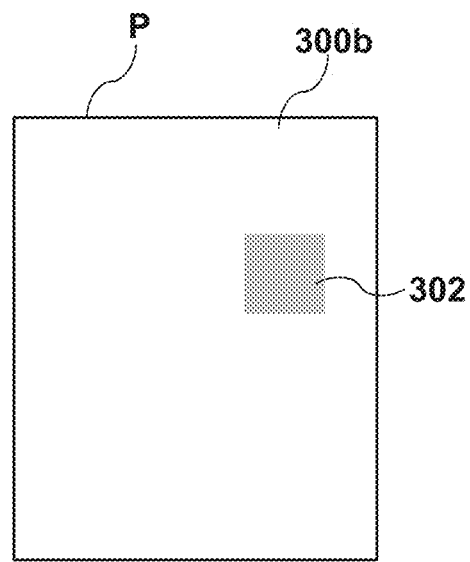

FIG. 3A shows a test image 301 formed on a printing surface 300a of a sheet P. FIG. 3B shows anon-printing surface 300b of the sheet P. A show-through image 302 on the non-printing surface 300b is an image in which the test image 301 formed on the printing surface 300a appears on the non-printing surface 300b. The show-through image 302 tends to occur as the density of the test image 301 increases. That is, the show-through image 302 corresponding to a low density region of the test image 301 is unlikely to occur. In the present embodiment, the test image is formed on the printing surface 300a, and the test image is not formed on the non-printing surface 300b. Further, the CPU 111 can detect edges, marks, or histograms from the read data and distinguish between the printing surface 300a and the non-printing surface 300b based on detection results. A method of distinguishing between the printing surface 300a and the non-printing surface 300b will be described in detail later.

Figure 3C:
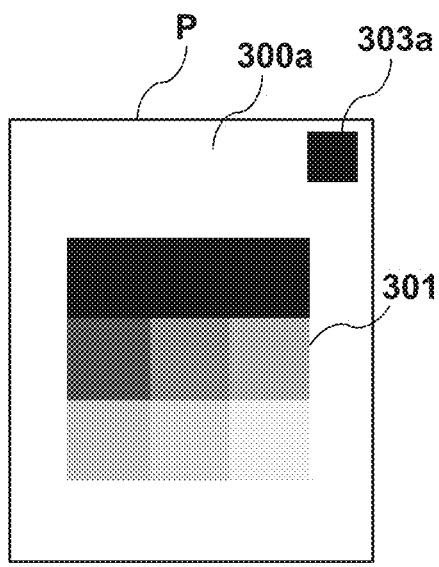
Figure 3D:
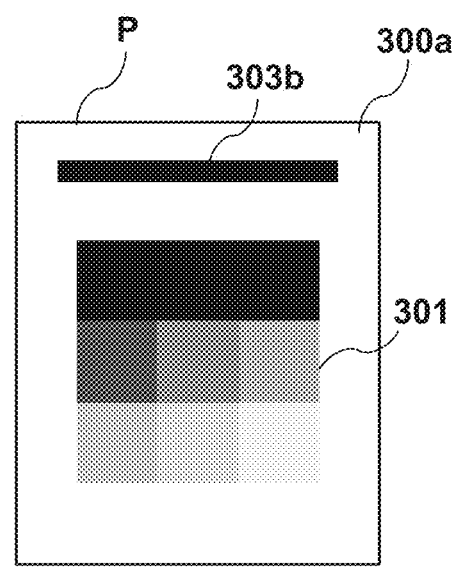

As shown in FIG. 3C, a mark 303a may be formed on the printing surface 300a together with the test image 301. As shown in FIG. 3D, a mark 303b may be formed on the printing surface 300a together with the test image 301. The marks 303a and 303b are not formed on the non-printing surface 300b. Alternatively, a configuration may be taken such that marks 303a and 303b are formed on the printing surface 300a, and marks different from the marks 303a and 303b are formed on the non-printing surface 300b. Alternatively, a configuration may be taken such that a mark is not formed on the printing surface 300a, and a mark is formed on the non-printing surface 300b. In the case when a mark is formed only on the printing surface 300a, since it is sufficient if the image forming apparatus 1 performs single-sided printing, the formation time of the test chart can be shortened. The test chart is a sheet P on which the test image 301 has been formed. In the case when a mark is formed only on the non-printing surface 300b, since the image forming apparatus 1 must perform double-sided printing, the formation time of the test chart will lengthen.

[CPU Functions]

FIG. 4 shows functions realized by CPU 111 executing the control program. However, all or part of these functions may be implemented by a hardware circuit such as a ASIC (Application Specific Integrated Circuits) or a FPGA (Field Programmable Gate Array).

A calibration unit 400 generates a tone correction condition based on a read result of the test image 301. A test image unit 401 generates test data 451, or reads out the test data 451 from the storage unit 112, and sends the test data 451 to the image processing unit 118. The test data 451 is image data for forming the test image 301 on the sheet P. A mark unit 402 is optional, and generates image data for forming the marks 303a and 303b on the sheet P, or reads out the image data from the storage unit 112 and sends the image data to the image processing unit 118. A generation unit 403 generates a tone correction condition (correction table 452) based on a read result of the test image 301. A UI unit 404 displays a calibration guidance message on the display apparatus of the operation unit 150, and accepts a user instruction from the input device. The calibration unit 400 controls the image reader 110 to read both the first surface and the second surface of the sheet P on which the test image 301 has been formed. From the image reader 110, the calibration unit 400 stores, in the storage unit 112, first read data 453, which is the read result of the first surface, and second read data 454, which is the read result of the second surface.

A selection unit 410 analyzes the first read data 453 and the second read data 454, and selects read data that includes the read result of the test image 301 from the first read data 453 and the second read data 454. An analysis unit 420 analyzes the first read data 453 and the second read data 454 in order to select the read data that includes the read result of the test image 301. A reduction unit 421 reduces the first read data 453 to generate first reduced data 455. A reduction unit 421 reduces the second read data 454 to generate second reduced data 456. The first read data 453 and the second read data 454 are high-resolution images because they are used for calibration. In contrast, in order to determine the printing surface 300a on which the test image 301 is formed, such a high-resolution image is unnecessary. Therefore, in order to speed up the analysis processing of the analysis unit 420, the reduction unit 421 may be employed. That is, the analysis unit 420 analyzes the first reduced data 455 and second reduced data 456 instead of the first read data 453 and the second read data 454. In the following, the description relating to the first read data 453 and the second read data 454 also applies to the first reduced data 455 and the second reduced data 456. An edge detection unit 422 detects edges included in the first read data 453 and the second read data 454.

Figure 5:
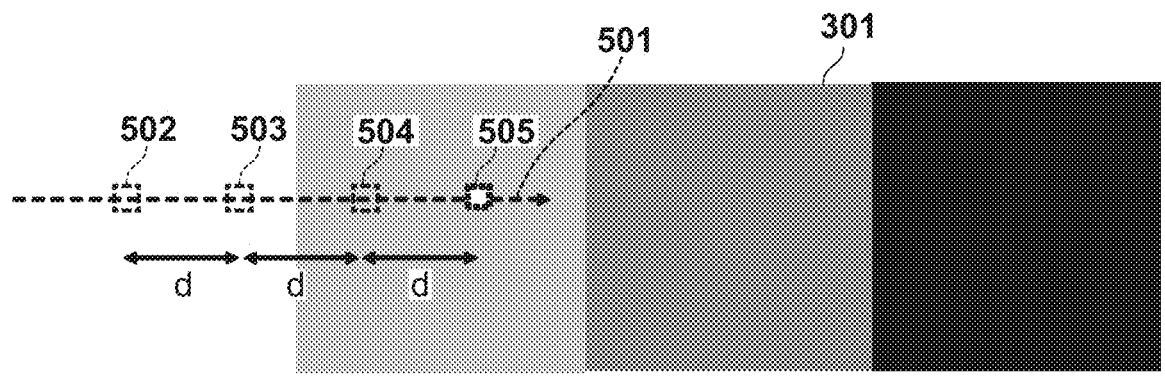
FIG. 5 is a diagram for describing edge detection.

FIG. 5 schematically shows image data of the test image 301 that is loaded into the image memory 119 by CPU 111. The edge detection unit 422 refers to pixel values of a plurality of pixels 502 to 505 respectively separated by a predetermined interval d in a direction indicated by an arrow 501 from the leading edge of the image data loaded into the image memory 119. The pixel value may be a luminance value or a density value. The edge detection unit 422 obtains a difference between pixel values of two adjacent pixels among the plurality of pixels 502 to 505. The edge detection unit 422 determines whether or not the difference exceeds a threshold. When the difference exceeds the threshold, the edge detection unit 422 determines that an edge exists between two pixels. When the difference does not exceed the threshold, the edge detection unit 422 determines that an edge does not exist between two pixels. From FIG. 5, it is determined that there is an edge between the pixel 503 and the pixel 504. The edge detection unit 422 determines the position of the edge or whether the position of the pixel 504 is within a predetermined range. When the position of the edge or whether the position of the pixel 504 is within the predetermined range, the edge detection unit 422 determines that the read data includes the test image 301. When the position of the edge or whether the position of the pixel 504 is not within the predetermined range, the edge detection unit 422 determines that the read data does not include the test image 301. It should be noted that even if, hypothetically, show-through occurs as shown in FIG. 3B, since the positions of the edge or the positions of the pixel 504 is not within the predetermined range, the CPU 111 determines that the test image 301 is not included in the read data. This is because, as shown in FIG. 3A and FIG. 3B, a high density test image, which causes show-through, is formed to be positioned outside the predetermined range.

A mark detection unit 423 analyzes the first read data 453 and the second read data 454, and determines whether or not the mark 303a (or 303b) is included in the first read data 453 or the second read data 454. The mark 303a (or 303b) is also formed at a predetermined position on the sheet P. Therefore, the mark detection unit 423 selects the first read data 453 when the mark 303a (or 303b) is formed at a predetermined position in the first read data 453. Therefore, the mark detection unit 423 selects the second read data 454 when the mark 303a (or 303b) is formed at a predetermined position in the second read data 454. Note that the mark 303a (or 303b) may be formed so as to have a low density such that show-through does not occur. According to this configuration, the CPU 111 can select the read data that includes test image from the first read data and the second read data based on the detection result (selection result) of the mark detection unit 423. Alternatively, the mark detection unit 423 may compare the luminance of the region in which the mark 303a (or 303b) is predicted to be formed, and determine the luminance based on the comparison result. When the luminance of the pixel in a predicted region of the first read data is lower than the luminance of the pixel in a predicted region of the second read data, the mark detection unit 423 selects the first read data 453. In contrast, when the luminance of the pixel in a predicted region of the second read data is lower than the luminance of the pixel in a predicted region of the first read data, the mark detection unit 423 selects the second read data 454.

The histogram unit 424 calculates a histogram for each of the first read data 453 and the second read data 454. The test image 301 is formed on the printing surface 300a of the sheet P, and the test image 301 is not formed on the non-printing surface 300b. That is, a histogram of the non-printing surface 300b should be similar to a histogram of a blank sheet. Alternatively, a histogram of the printing surface 300a should be a unique histogram derived from the test image 301. Therefore, a histogram unit 424 may select read data that includes a read result of the test image 301 from the first read data 453 and the second read data 454 based on a histogram.

A determination unit 430 determines a read data that includes the test image 301 from the first read data 453 and the second read data 454 based on the analysis result of the analysis unit 420. The determination unit 430 notifies the generation unit 403 of which of the first read data 453 and the second read data 454 is to be used.

[Calibration Flow Chart]

Creating Test Charts

Figure 6:
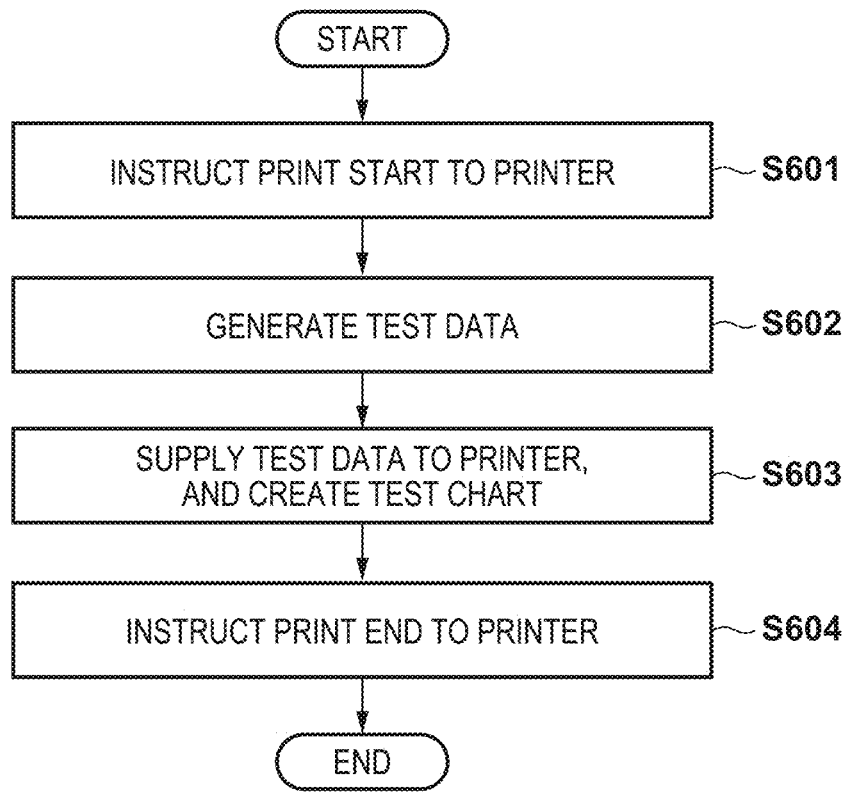
FIG. 6 is a flow chart illustrating a method of creating a test chart.

FIG. 6 shows a method of creating a test chart that is executed by the CPU 111 according to a control program. The calibration is divided into a test chart creation process and a tone correction condition creation process. When an instruction to execute calibration is inputted from the operation unit 150, or the like, the CPU 111 executes the following process.

In step S601, the CPU 111 (test image unit 401) instructs the printer 100 to start printing. When instructed to start printing, the printer 100 performs a preparation operation required to execute printing, and waits for image data (an image signal) to be outputted from the control unit 10.

In step S602, the CPU 111 (test image unit 401) generates the test data 451 which is image data of a test image. This is a process of writing the test data 451 into the image memory 119 as image data. The test data 451 may be stored in the storage unit 112 in advance. The test image unit 401 may generate the test data 451 according to the control program.

In step S603, the CPU 111 (test image unit 401) supplies the test data 451 which has been loaded into the image memory 119 to the printer 100 via the device IF 116, thereby causing the printer 100 to produce a test chart. The printer 100 creates a test chart by forming the test image 301 on a sheet P.

In step S604, the CPU 111 (test image unit 401) instructs the printer 100 to end printing.

Generation of Tone Correction Condition

Figure 7:
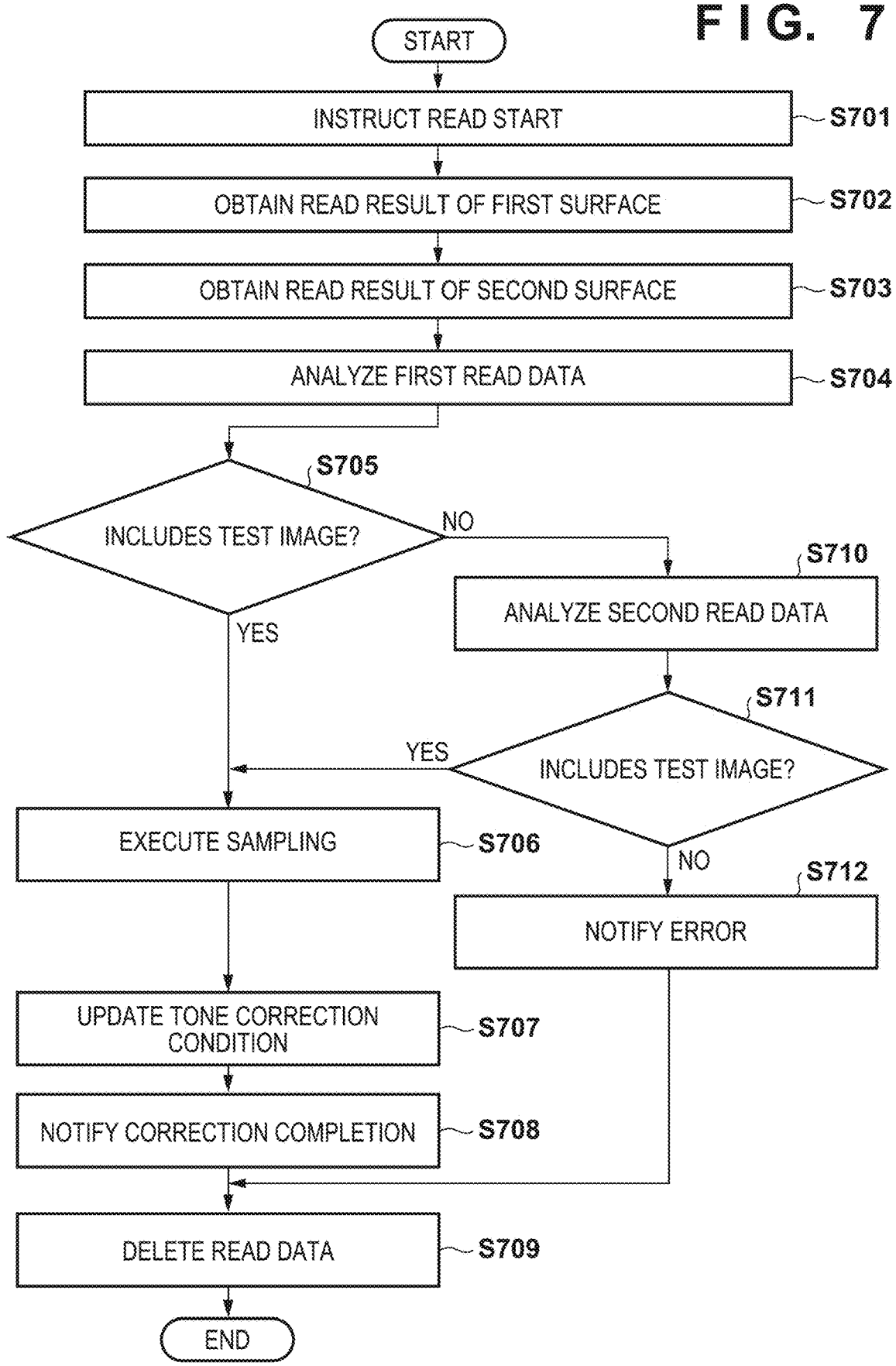
FIG. 7 is a flow chart illustrating a method of generating a tone correction condition.

FIG. 7 shows a method of generating a tone correction condition that is executed by the CPU 111 according to a control program. When the creation of the test chart is completed, the CPU 111 executes the following process.

In step S701, the CPU 111 (calibration unit 400) instructs the image reader 110 to start reading. The CPU 111 may display a message on the display apparatus of the operation unit 150, the message prompting that the test chart be placed on the document tray 81. A user may place the test chart on the document tray 81 so that the test image 301 can be seen, or may place the test chart on the document tray 81 so that the test image cannot be seen.

In step S702, the CPU 111 (calibration unit 400) obtains a read result of a first surface of the test chart from the image reader 110. For example, the CPU 111 receives the first read data 453 output by the image reader 110 and stores it in the storage unit 112. As described above, the CPU 111 may reduce the first read data 453 to generate the first reduced data 455 and store it in the storage unit 112. The CPU 111 may display a message on the operation unit 150, the message prompting for the test chart to be placed on the document tray 81 after inverting the front and back surfaces.

In step S703, the CPU 111 (calibration unit 400) obtains a read result of a second surface of the test chart from the image reader 110. For example, the CPU 111 receives the second read data 454 output by the image reader 110 and stores it in the storage unit 112. As described above, the CPU 111 may reduce the second read data 454 to generate the second reduced data 456 and store it in the storage unit 112.

In step S704, the CPU 111 (analysis unit 420) analyzes the first read data 453. Instead of the first read data 453, the first reduced data 455 may be analyzed. The read data may be loaded into the image memory 119 in order to speed up the analysis processing. An analysis result may be any information useful for determining the presence or absence of the test image 301, such as a detection result of an edge (e.g., the presence or absence of an edge or the position of an edge), a detection result of a mark, a calculation result of a histogram, or the like.

In step S705, the CPU 111 (determination unit 430) determines whether or not the first read data 453 includes a read result of a test image based on the analysis result. If the first read data 453 includes a result of reading the test image, the CPU 111 advances the process to step S706. If the first read data 453 does not include a result of reading the test image, the CPU 111 advances the process to step S710.

When the First Read Data 453 Includes the Result of Reading the Test Image

In step S706, the CPU 111 (generation unit 403) executes sampling of the first read data 453 to create a tone correction condition. The test image 301 has a plurality of tone patterns (patch images) having respectively different tones. Therefore, the generation unit 403 performs sampling for each of the plurality of tone patterns.

In step S707, the CPU 111 (generation unit 403) updates the tone correction condition based on the sampling result. For example, the tone correction condition of a certain tone is updated by comparing a sampling result of the tone with the test data 451 of the tone. As described above, the tone correction condition may be a tone correction table (correction table 452). The generation unit 403 creates a new correction table 452 based on the sampling result, and overwrites the old correction table 452 stored in the storage unit 112.

In step S708, the CPU 111 (UI unit 404) notifies the user of the completion of the correction. For example, the UI unit 404 may display a message indicating the completion of the correction on the operation unit 150.

In step S708, the CPU 111 (generation unit 403) deletes the read data (e.g., first read data 453, second read data 454, first reduced data 455, and second reduced data 456) from the storage unit 112 and the image memory 119.

When the First Read Data 453 does not Include a Result of Reading the Test Image In step S710, the CPU 111 (analysis unit 420) analyzes the second read data 454. Instead of the second read data 454, the second reduced data 456 may be analyzed. The read data may be loaded into the image memory 119 in order to speed up the analysis processing. An analysis result may be any information useful for determining the presence or absence of the test image 301, such as a detection result of an edge (e.g., the presence or absence of an edge or the position of an edge), a detection result of a mark, a calculation result of a histogram, or the like.

In step S711, the CPU 111 (determination unit 430) determines whether or not the second read data 454 includes a read result of a test image based on the analysis result. If the second read data 454 includes a result of reading the test image, the CPU 111 advances the process to step S706. In this instance, step S706 or step S709 is performed on the second read data 454. If the second read data 454 does not include a result of reading the test image, the CPU 111 advances the process to step S712.

When the Second Read Data 454 Also does not Include a Result of Reading the Test Image In step S712, the CPU 111 (UI unit 404) notifies the user of an error. For example, the UI unit 404 may display, on the operation unit 150, a message indicating that an error has occurred. It is generally not the case that both the first read data 453 and the second read data 454 do not include a test image. However, if the user forgets to invert the front and back of the test chart, such an error may occur.

Second Embodiment

Figure 8:
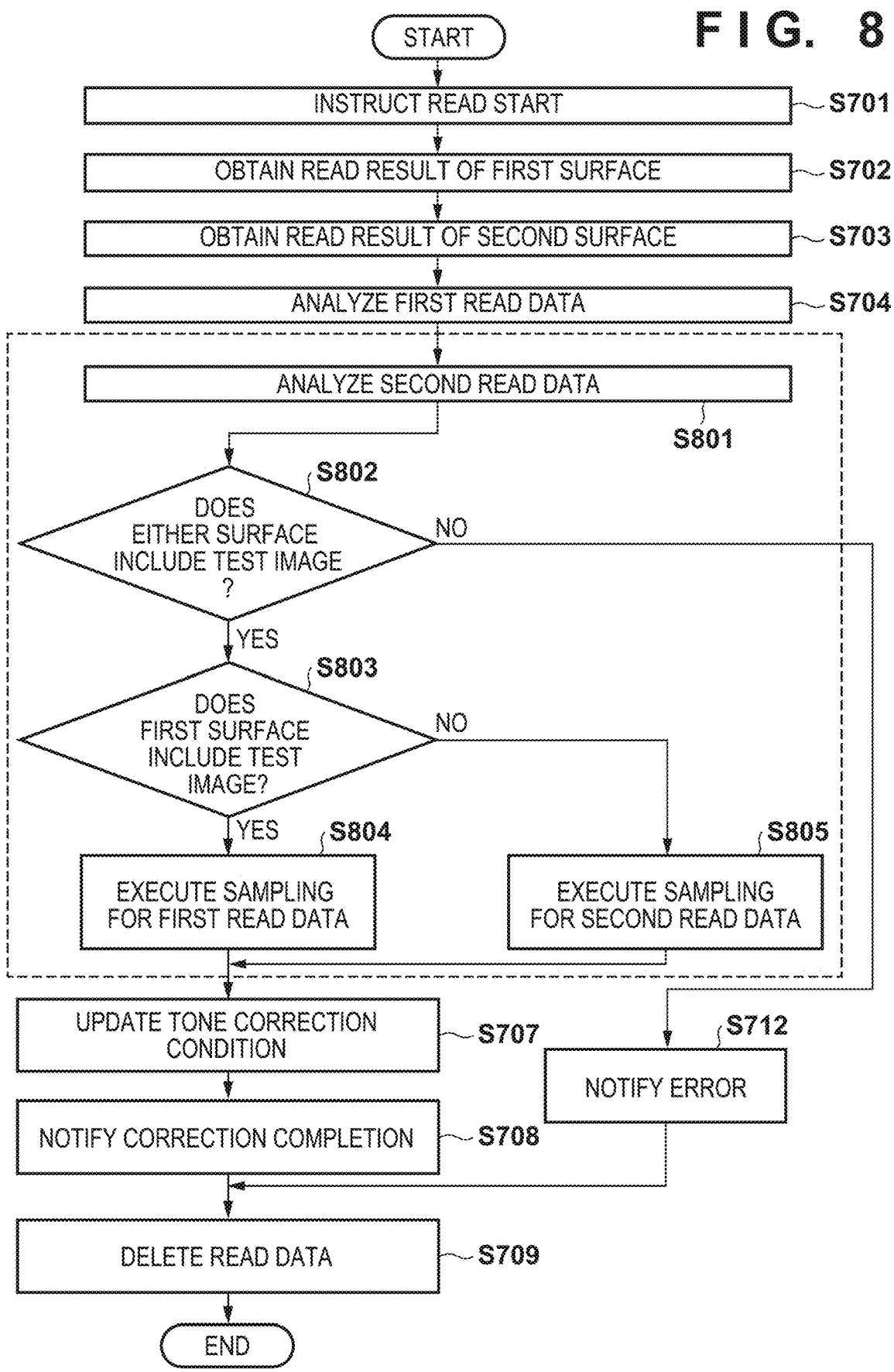
FIG. 8 is a flow chart illustrating a method of generating a tone correction condition.

FIG. 8 shows another method of generating a tone correction condition that is executed by the CPU 111 according to a control program. FIG. 8 differs from FIG. 7 in that step S705, step S706, step S710, and step S711 are replaced by step S801 to step S805. Here, step S801 to step S805 will be mainly described. Items already described with reference to FIG. 7 will not be described in order to avoid duplication of description. When step S704 is completed, the CPU 111 advances the process to step S801.

In step S801, the CPU 111 analyzes the second read data 454. Step S801 is the same processing as step S710.

In step S802, the CPU 111 determines whether one of the first surface and the second surface of the test chart includes the test image 301 based on the analysis result of the first read data 453 and the second read data 454. That is, the CPU 111 determines whether either of the first read data 453 and the second read data 454 includes a read result of the test image 301. As described above, the presence or absence of the test image 301 may be determined based on edges, marks, or histograms. If either of the first read data 453 or the second read data 454 includes a read result of the test image 301, the CPU 111 advances the process to step S803. If both of the first read data 453 or the second read data 454 do not include a read result of the test image 301, the CPU 111 advances the process to step S712.

In step S803, the CPU 111 determines whether the first surface includes the test image 301. For example, the determination unit 430 determines whether or not the first read data 453 includes the read result of the test image 301 based on the analysis result of the first read data 453. As described above, the presence or absence of the test image 301 may be determined based on edges, marks, or histograms. If the first surface includes the test image 301, the CPU 111 advances the process to step S804. If the first surface does not include the test image 301 (if the second surface includes the test image 301), the CPU 111 advances the process to step S805.

In step S804, the CPU 111 (generation unit 403) executes sampling of the first read data 453 to create a tone correction condition. Step S804 is the same processing as step S706.

In step S805, the CPU 111 (generation unit 403) executes sampling of the second read data 454 to create a tone correction condition. Step S805 is also the same processing as step S706.

Third Embodiment

Figure 9:
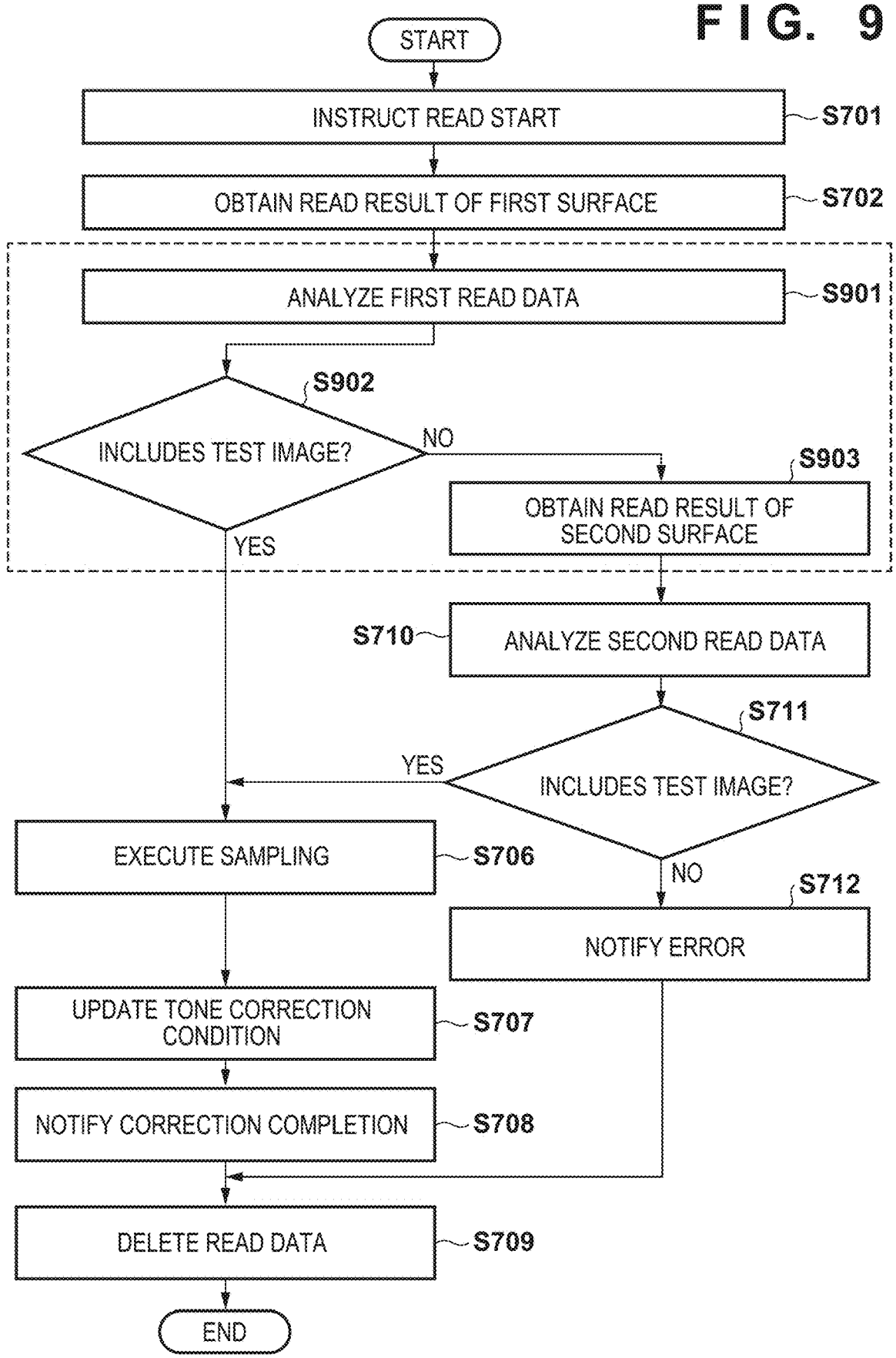
FIG. 9 is a flow chart illustrating a method of generating a tone correction condition.

FIG. 9 shows another method of generating a tone correction condition that is executed by the CPU 111 according to a control program. FIG. 9 differs from FIG. 7 in that step S703 to step S705 are replaced by step S901 to step S903. Here, step S901 to step S903 will be mainly described. Items already described with reference to FIG. 7 will not be described in order to avoid duplication of description. When step S702 is completed, the CPU 111 advances the process to step S901.

In step S901, the CPU 111 analyzes the first read data 453. Step S901 is the same processing as step S704.

In step S902, the CPU 111 (determination unit 430) determines whether or not the first read data 453 includes a read result of a test image based on the analysis result. If the first read data 453 includes a result of reading the test image, the CPU 111 advances the process to step S706. If the first read data 453 does not include a result of reading the test image, the CPU 111 advances the process to step S903.

In step S903, the CPU 111 obtains a read result of a second surface of the test chart from the image reader 110. Step S903 is the same processing as step S703. CPU 111 then advances the process to step S710.

As described above, in FIG. 9, the process for reading the second surface is executed only when the test image 301 is not formed on the first surface. When the test image 301 is formed on the first surface, the process for reading the second surface is skipped. Compared to FIGS. 7 and 8, in FIG. 9, the time from the start to the end of the calibration should be shortened.

Other Embodiments

Figure 10:
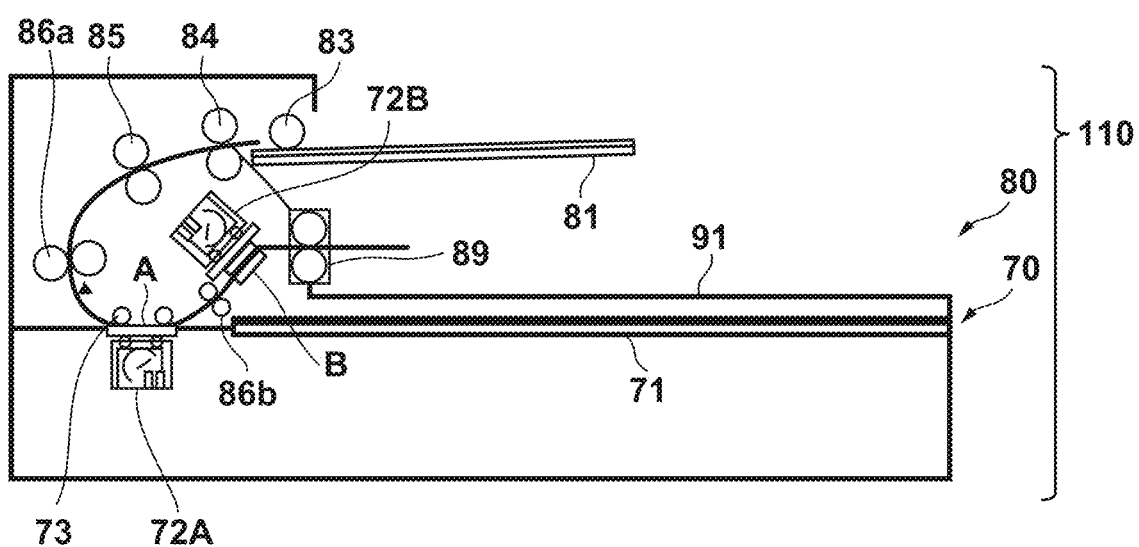
FIG. 10 is a cross-sectional view for describing another embodiment of the image reader.

The image forming apparatus 1 may have the image reader 110 shown in FIG. 10 instead of the image reader 110 shown in FIG. 1. The configuration of the image reader 110 shown in FIG. 10 will be described in detail. The image reader 110 in FIG. 10 includes the document feeder 80 and the reading unit 70. The document feeder 80 of the image reader shown in FIG. 10 is different from the document feeder 80 of the image reader 110 shown in FIG. 1. An image sensor 72A has the same configuration as the image sensor 72 of FIG. 1.

The pickup roller 83 feeds a document (sheet) stacked on the document tray 81 to the inside of the document feeder 80. The rotation of the separation rollers 84 is controlled so as to prevent a plurality of documents (sheets) from being simultaneously fed by the pickup roller 83. The document (sheet) fed to the conveyance path is conveyed toward the reading position A by the conveyance rollers 85 and 86a. Here, the reading unit 70 has a transparent glass 73 at a position facing the reading position A. Although the glass 73 is provided separately from the platen 71, a part of the platen 71 may overlap the reading position A.

An opening is formed in the document feeder 80 so that a document (sheet) conveyed by the document feeder 80 is pressed against the glass 73 of the reading unit 70 at the reading position A. When the image sensor 72A reads a document (sheet) conveyed to the document feeder 80, the image sensor 72A of the reading unit 70 moves directly under the glass 73. When the image sensor 72A reads a document (sheet) conveyed to the document feeder 80, the image sensor 72A remains directly below the reading position A. As a result, by the document (sheet) passing through the reading position A in accordance with the document feeder, the document (sheet) that passes through the reading position A is read by the image sensor 72A. Thereafter, the surface of the document (sheet) read by the image sensor 72A is referred to as the first surface.

Note that the document feeder 80 includes, upstream of the reading position A in the conveyance direction of the document (sheet), a sensor for detecting the leading edge of the document (sheet) conveyed along the conveyance path. The control unit 10 controls the timing at which the image sensor 72A starts reading the document (sheet) based on the timing at which the sensor detects the leading edge of the document (sheet). The document feeder 80 has a backup roller for suppressing the flapping of a document (sheet) passing through the reading position A.

The document (sheet) passing through the reading position A is conveyed toward the reading position B by conveyance rollers 86b. The document feeder 80 includes an image sensor 72B for reading a document (sheet) conveyed to the reading position B. For the image sensor 72B, the depth direction of FIG. 10 is a longitudinal direction. The image sensor 72B further includes an LED and an optical component. For the image sensor 72B, a direction orthogonal to the conveyance direction of a sheet is the longitudinal direction. The image sensor 72B has a plurality of pixels that receive R (red), G (green), and B (blue) light along the longitudinal direction. The image sensor 72B reads a second surface, which is the back surface of the first surface of the document (sheet) that is read by the image sensor 72A.

The image sensor 72B reads the second surface of the document (sheet) in the following manner. More specifically, an LED serving as a light source irradiates light onto the second surface of the document (sheet). The reflected light from the document (sheet) passes through the glass and reaches the optical component. The optical component guides the reflected light from the document (sheet) to the image sensor 72B. The image sensor 72B outputs analog read data based on the received reflected light. Note that the image sensor 72B simultaneously reads an image for one line that spans the longitudinal direction of the image sensor 72B. Therefore, the image sensor 72B performs reading a plurality of times while conveying the document (sheet), thereby obtaining analog read data for one page of the document (sheet). The analog read data is converted into digital read data (second read data) by an A/D conversion circuit (not shown) of the image sensor 72B, and is output to the control unit 10.

A timing at which the image sensor 72B starts reading is also controlled based on the timing at which the sensor detects the leading edge of the document (sheet). The document (sheet) having passed through the reading position B is discharged to the discharge tray 91 by a discharge roller 89.

The image sensor 72A of the present embodiment includes an LED as a light source and an optical component that includes a lens, and reads the surface of a document (sheet) placed on the platen 71 by receiving light reflected from the document (sheet). Note that the reading unit 70 may be configured to have a housing that includes an LED and an optical component, and an image sensor 72, where the housing that includes the LED and the optical component moves without moving the image sensor 72.

Next, a description is given for a method of generating the tone correction condition executed by the CPU 111 of the present embodiment according to the control program, with attention given to differences from FIG. 7 of the first embodiment. The CPU 111 (the calibration unit 400) of the present embodiment obtains the read result of the first surface of the test chart from the image sensor 72A in step S702, and obtains the read result of the second surface of the test chart from the image sensor 72B in step S703. The CPU 111 obtains the first read data 453 obtained from the image sensor 72A and the second read data 454 obtained from the image sensor 72B, and stores them in the storage unit 112. CPU 111 may generate the first reduced data 455 from the first read data 453 and generate the second reduced data 456 from the second read data 454. At this time, the CPU 111 stores the first reduced data 455 and the second reduced data 456 in the storage unit 112. Since the processing of the other steps is the same as that of FIG. 7, the description thereof is omitted.

When the sheet sensor 82 does not detect that a document (sheet) is placed on the document tray 81 and a reading start instruction is input, it is presumed that the document (sheet) is placed on the platen 71. Therefore, the image reading unit 70 performs known document fixed reading. Since document fixed reading is a well-known technique, a detailed description thereof is omitted.

The document feeder 80 of FIG. 1 does not have a reading unit for reading the second surface of the document (sheet) on a side opposite to the first surface of the document (sheet) read by the reading unit 70. Therefore, for the image reader 110 of FIG. 1, a user has to place the sheet discharged to the discharge tray 91 on the document tray 81 again in order to obtain the read data on both sides of the sheet. In contrast, for the image reader 110 of FIG. 10, a reading unit for reading the second surface of the sheet is also disposed in the document feeder 80. As a result, it is unnecessary for a user to place a sheet discharged to the discharge tray 91 on the document tray 81 again. Further, by the image reader 110 of FIG. 10, since it is not necessary to replace the sheet on which one surface of the sheet has been read, there is no occurrence of a problem where both first read data and second read data become read data of a non-printing surface on which the test image 301 is not formed.

In the first to third embodiments and other embodiments, a description is given regarding a configuration in which the test chart used for generating a tone correction condition is conveyed and read by the document feeder 80. However, the test chart that is conveyed and read by the document feeder 80 is not limited to one for generating a tone correction condition, and may be, for example, a test chart for adjusting a transfer condition for transferring a toner image. In a test chart for adjusting the transfer condition for transferring a toner image, test images having different transfer conditions are also formed only on one of the first surface and the second surface of a sheet P (the printing surface 300*a*).

The test chart for adjusting the transfer condition for transferring a toner image is, for example, a sheet P on which a plurality of test images having different transfer conditions are formed. Here, the transfer condition is, for example, a transfer voltage applied to the secondary transfer roller 19. The resistance values of the secondary transfer roller 19 and the intermediate transfer member 17 change due to temperature, humidity, and accumulated driving time. When the resistance values of the secondary transfer roller 19 and the intermediate transfer member 17 change, the transfer efficiency is lowered and the density of an output image to be formed by the image forming apparatus 1 is changed. Therefore, the control unit 10 adjusts the image quality of an output image to be formed by the image forming apparatus 1 by adjusting the transfer condition based on read data relating to a test chart for adjusting the transfer condition for transferring a toner image.

In this manner, the control unit 10 may adjust the image quality of an output image to be formed by the image forming apparatus 1 by deciding an image forming condition for control of the image forming unit 50 based on read data selected from the first read data and the second read data. For example, as described above, the image forming condition decided by the control unit 10 comprises a transfer condition for controlling the transfer unit (e.g., the secondary transfer roller 19) which transfers the image.

Further, the information processing apparatus having the function of the control unit 10 in the above-described first to third embodiments and other embodiments may be realized. In this instance, the device IF 116 obtains first read data relating to a read result of a first surface of a sheet outputted from a reading device, and receives second read data relating to a read result of a second surface differing from the first surface of the sheet. The CPU 111 selects, from the first read data and the second read data, read data relating to a read result of the test image printed on one side of the sheet by the printer. The CPU 111 generates, based on the read data selected by the selection unit, a tone correction condition for correcting a tone characteristic of an image to be formed by the printer. In such an information processing apparatus, the device IF 116 may be configured to obtain first read data output from a first sensor of the reading device, which reads a first surface of the sheet, and to obtain second read data output from a second sensor of the reading device, which reads a second surface of the sheet.

Technical Ideas and Effects Derived from the First to Third Embodiments

[Aspect 1]

As shown in FIG. 1, the printer 100 forms a test image 301 for deciding the tone correction condition on only one of the first surface and the second surface of a sheet P, (the printing surface 300*a*). The image reader 110 reads the first surface and the second surface of the sheet P to generate read data (first read data 453) of the first surface and read data (second read data 454) of the second surface. The selection unit 410 analyzes the read data of the first surface and the read data of the second surface, and selects read data that includes a read result of the test image 301 from the read data of the first surface and the read data of the second surface. A generation unit 403 generates a tone correction condition (for example, the correction table 452) based on selected read data. As described above, according to the present embodiment, both the front surface and the back surface of the sheet P are read in principle. In particular, in the first reading processing, the user may place the sheet P on the document tray 81 so that the printing surface 300*a* is visible, or may place the sheet P on the document tray 81 so that the printing surface 300*a* is not visible. As a result, the burden on the user regarding placing the sheet P on which the test image is formed is reduced. In addition, the image forming apparatus 1 selects read data that includes a read result of the test image 301, and generates atone correction condition based on the selected read data. The image forming apparatus 1 can correct the tone characteristic of an output image to be formed by the image forming apparatus 1 to be an ideal tone characteristic by using the generated tone correction condition.

[Aspect 2]

The document feeder 80 is an example of an automatic document feeder. The sheet P is placed on the document tray 81. The conveyance rollers 85 conveys the sheet. After the sheet is placed so that the first surface is read, the sheet is placed so that the second surface is read. That is, when the first reading processing is completed, it is sufficient if the user merely inverts the front and back of the sheet P for the second reading processing.

[Aspect 3]

When the first surface is read, the display apparatus of the operation unit 150 outputs a message prompting that the sheet be placed after inverting the front and back of the sheet. This should enable a user to perform a sheet inversion operation without hesitation.

[Aspect 4]

As described in connection with FIG. 5, the selection unit 410 may perform edge detection on the read data of the first surface and select the read data of the first surface when an edge exists at a predetermined position. The selection unit 410 may perform edge detection on the read data of the second surface and select the read data of the second surface when an edge exists at a predetermined position. As shown in FIG. 5, an edge exists on the outer periphery of the test image 301. Therefore, the presence or absence of the test image 301 may be determined by paying attention to an edge.

[Aspect 5]

In some cases, an edge does not exist at a predetermined position in the read data of the first surface, and an edge does not exist at a predetermined position in the read data of the second surface. For example, if the user forgets to invert the sheet or places a sheet different from the test chart on the document tray 81, such a case may occur. In this case, the selection unit 410 does not select either the read data of the first surface or the read data of the second surface. This makes it less likely for an erroneous tone correction condition to be generated.

[Aspect 6]

A configuration may be taken such that the printer 100 forms the test image and a first marks (e.g., marks 303*a* or 303*b*) on only one of the first surface and the second surfaces. A configuration may be taken such that the selection unit 410 analyzes the read data of the first surface and the read data of the second surface, and selects read data that includes a first mark from the read data of the first surface and the read data of the second surface. By forming such a mark, the printing surface 300a and the non-printing surface 300b should be easily distinguished from each other.

[Aspect 7]

As shown in FIG. 3C, and the like, the printer 100 may form the first mark at a position apart from the test image 301. As a result, the first mark is unlikely to affect the creation of the tone correction condition.

[Aspect 8]

The printer 100 may form a second mark different from the first mark without forming the test image 301 on the other of the first surface and the second surface. By forming such a mark, the printing surface 300a and the non-printing surface 300b should be easily distinguished from each other.

[Aspect 9]

A configuration may be taken such that the selection unit 410 obtains a histogram for the read data of the first surface, and selects the read data of the second surface if the histogram obtained for the read data of the first surface is a histogram specific to a blank sheet. A configuration may be taken such that the selection unit 410 obtains a histogram for the read data of the second surface, and selects the read data of the first surface if the histogram obtained for the read data of the second surface is a histogram specific to a blank sheet. In the present embodiment, configuration may be taken such that the test image 301 is formed only on the printing surface 300a, and the non-printing surface 300b is left blank. Therefore, based on the histograms, the printing surface 300a and the non-printing surface 300b should be easily distinguished from each other.

[Aspect 10]

A configuration may be taken such that the selection unit 410 obtains a histogram for the read data of the first surface, and selects the read data of the first surface if the histogram obtained for the read data of the first surface is a histogram specific to the test image. A configuration may be taken such that the selection unit 410 obtains a histogram for the read data of the second surface, and selects the read data of the second surface if the histogram obtained for the read data of the second surface is a histogram specific to the test image. In the present embodiment, a configuration may be taken such that the test image 301 is formed only on the printing surface 300a, and the non-printing surface 300b is left blank. Therefore, based on the histograms, the printing surface 300a and the non-printing surface 300b should be easily distinguished from each other.

[Aspect 11]

The tone correction condition may be a one-dimensional tone correction table (e.g., the correction table 452) that converts a tone characteristic of input image data to generate output image data. The image processing unit 118 converts the tone characteristic of input image data using the tone correction table to generate output image data. The input image data is generated by an image reader or by developing a print job. Alternatively, the input image data may be generated by converting the color space of such image data. The output image data is image data generated to be supplied to the printer. As a result, the tone characteristic of an input image and the tone characteristic of an output image that is formed on the sheet P will approach each other.

[Aspect 12]

As shown in FIG. 7, and the like, the selection unit 410 may analyze the read data of the first surface and select the read data of the first surface when the read data of the first surface includes a read result of the test image 301. The generation unit 403 may generate the tone correction condition based on the selected read data of the first surface. A configuration may be taken such that the selection unit 410 analyzes the read data of the second surface when the read data of the first surface does not include a read result of the test image, and selects the read data of the second surface when the read data of the second surface includes a read result of the test image. The generation unit 403 may generate the tone correction condition based on the selected read data of the second surface.

[Aspect 13]

As shown in FIG. 8, the selection unit 410 may analyze the read data of the first surface and the read data of the second surface to determine which of the read data of the first surface and the read data of the second surface includes a read result of the test image. Thus, the selection unit 410 may select the read data that includes a read result of the test image. The generation unit 403 may generate the tone correction condition based on the selected read data.

[Aspect 14]

As shown in FIG. 9, when the selection unit 410 selects the read data of the first surface, the image reader 110 may skip the reading of the second surface of the sheet. This will reduce time required for calibration.

[Aspect 15]

As shown in FIG. 4, the reduction unit 421 generates first reduced data obtained by reducing the read data of the first surface and second reduced data obtained by reducing the read data of the second surface. The analysis unit 420 analyses the first reduced data and the second reduced data. The selection unit 410 may select read data that includes a read result of the test image from the read data of the first surface and the read data of the second surface based on at least one of an analysis result of the first reduced data and an analysis result of the second reduced data. By analyzing read data whose size has been reduced in this manner, the analysis time will be reduced.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
an image forming unit configured to form an image based on image data;
a document feeding unit including a stacking tray on which a document is to be stacked, a conveying unit configured to convey the document stacked on the stacking tray, a reading sensor configured to read an image of a lower surface of the document on the stacking tray while the conveying unit conveys the document, a discharging unit configured to discharge the document whose image has been read, and a discharge tray on which the document discharged by the discharging unit;
a reading unit including a reading sensor configured to read an image of a upper surface of the document on the stacking tray while the conveying unit conveys the document, and a platen on which a document is to be placed, the reading sensor of the reading unit being configured to read an image of the document placed on the platen, the upper surface of the document being opposite to the lower surface of the document; and
a controller configured:
to control the image forming unit to form a test image on one surface of a sheet;
to control the conveying unit to convey the sheet having the test image on the one surface;
to control the reading sensor of the reading unit to read an image of an upper surface of the sheet having the test image on the one surface while the conveying unit conveys the sheet having the test image on the one surface;
to control the reading sensor of the document feeding unit to read an image of a lower surface of the sheet having the test image on the one surface while the conveying unit conveys the sheet having the test image on the one surface;
to obtain first read data relating to the image of the upper surface of the sheet having the test image on the one surface, the first read data being outputted by the reading sensor of the reading unit;
to obtain second read data relating to the image of the lower surface of the sheet having the test image on the one surface, the second read data being outputted by the reading sensor of the document feeding unit;
to select read data corresponding to the one surface on which the test image is formed from the first read data and the second read data; and
to control, based on the selected read data, a density of an image to be formed by the image forming unit.

2. The image forming apparatus according to claim 1, further comprising
an image processor configured to convert the image data based on a tone correction condition,
wherein the controller is further configured to generate the tone correction condition based on the selected read data, and the image forming unit is further configured to form the image based on the image data converted by the image processor.

3. The image forming apparatus according to claim 1, wherein the image forming unit is controlled based on an image forming condition, and
the controller is further configured to generate the image forming condition based on the selected read data.

4. The image forming apparatus according to claim 3, wherein the image forming unit includes in a transfer unit that transfers the image onto a sheet, and
the image forming condition includes a transfer condition for controlling the transfer unit.

5. An information processing apparatus that enables communication with an image forming apparatus that forms an image, the image processing apparatus comprising:
an interface configured to receive first read data output from a first reading sensor of a reading device, and second read data output from a second reading sensor of the reading device, the first read data relating to a first surface of a sheet having a test image on one surface, the second read data relating to a second surface different from the first surface of the sheet having the test image on the one surface, the test image being formed by the image forming apparatus; and
a controller configured:
to select, from the first read data and the second read data, read data corresponding to the one surface on which the test image is formed, and
to control a density of an image to be formed by the image forming apparatus based on the selected read data.

6. The image forming apparatus according to claim 1, wherein the controller notifies an error in a case when the read data relating to the test image does not include the first read data and the second read data.

7. The image forming apparatus according to claim 1, wherein the one surface of the sheet has mark formed by the image forming unit, and
the controller selects the read data corresponding to the one surface on which the test image is formed from the first read data and the second read data based on a reading result of the mark.

8. The image forming apparatus according to claim 1, wherein the controller detects an edge of the test image from the first read data and the second read data, and
the controller selects the read data corresponding to the one surface on which the test image is formed from the first read data and the second read data based on a detecting result of the edge.

9. The information processing apparatus according to claim 5, wherein the controller controls the density of the image to be formed by generating a tone correction condition for correcting a tone characteristic of the image to be formed by the image forming apparatus, based on the selected read data.

10. The information processing apparatus according to claim 5, wherein the image forming apparatus is controlled based on an image forming condition, and
the controller controls the density of the image to be formed by generating the image forming condition based on the selected read data.

11. The information processing apparatus according to claim 10, wherein the image forming apparatus includes in a transfer unit that transfers the image onto a sheet, and
the image forming condition includes a transfer condition for controlling the transfer unit.

12. The information processing apparatus according to claim 5, wherein the controller notifies an error in a case where that the read data relating to the test image does not include in the first read data and the second read data.

13. The information processing apparatus according to claim 5, wherein the one surface of the sheet has mark formed by the image forming unit, and
the controller selects the read data corresponding to the one surface on which the test image is formed from the first read data and the second read data based on a reading result of the mark.

14. An information processing apparatus comprising:
an image forming unit configured to form an image based on image data;
an image reading unit including a reading unit and a document conveying unit,
wherein the reading unit comprises:
a platen on which a document is to be placed; and
a first reading sensor configured to read the document on the platen, the first reading sensor reading a surface of the document facing the platen,
wherein the document conveying unit comprises:
a stacking tray on which a document is stacked;
a conveying unit configured to convey the document stacked on the stacking tray; and
a second reading sensor configured to read the document conveyed by the conveying unit, the second reading sensor positioned and configured to read a lower surface of the document stacked on the stacking tray,
wherein the first reading sensor is capable of reading the document conveyed by the conveying unit and is capable of reading an upper surface of the document stacked on the stacking tray; and
a controller configured:
(1) to form a test image on one surface of a sheet;
(2) to control the conveying unit to convey the sheet stacked on the stacking tray as the document, the sheet having the test image on the one surface formed on the sheet; and
(3) to control a density of an image to be formed by the image forming unit based on a read result of a reading sensor that has read the test image among a reading result of the first reading sensor and a reading result of the second reading sensor.

15. The information processing apparatus according to claim 14, wherein the controller controls the density of the image to be formed by generating a tone correction condition for correcting a tone characteristic of the image to be formed by the image forming apparatus, based on the read result of the reading sensor that has read the test image among the reading result of the first reading sensor and the reading result of the second reading sensor.

16. The information processing apparatus according to claim 14, wherein the image forming unit is controlled based on an image forming condition, and
the controller controls the density of the image to be formed by generating the image forming condition based on the read result of the reading sensor that has read the test image among the reading result of the first reading sensor and the reading result of the second reading sensor.

17. The information processing apparatus according to claim 16, wherein the image forming unit includes in a transfer unit that transfers the image onto a sheet, and
the image forming condition includes a transfer condition for controlling the transfer unit.

18. The information processing apparatus according to claim 14, wherein the controller notifies an error in a case when both the reading result of the first image reading sensor and the reading result of the second image sensor are not the reading result of the reading sensor that has read the test image.

19. The information processing apparatus according to claim 14, wherein the one surface of the sheet has a mark formed by the image forming unit, and
the controller determines the read result of the reading sensor that has read the test image among the reading result of the first reading sensor and the reading result of the second reading sensor based on a read result of the mark.

* * * * *